US007014893B2

(12) United States Patent
Wicher et al.

(10) Patent No.: US 7,014,893 B2
(45) Date of Patent: Mar. 21, 2006

(54) SUPPORT MATERIAL FOR RECORDING LAYERS

(75) Inventors: Martina Wicher, Bissendorf (DE); Frank Römermann, Osnabrück (DE)

(73) Assignee: Felix Schoeller jr. Foto-und Spezialpapiere GmbH & Co. KG, (DE)

( * ) Notice: Subject to any disclaimer, the term of this patent is extended or adjusted under 35 U.S.C. 154(b) by 0 days.

(21) Appl. No.: 09/785,955

(22) Filed: Feb. 16, 2001

(65) Prior Publication Data

US 2001/0026869 A1 Oct. 4, 2001

(30) Foreign Application Priority Data

Feb. 18, 2000 (DE) ................................ 100 07 484

(51) Int. Cl.
*B32B 5/16* (2006.01)
*B32B 23/08* (2006.01)

(52) U.S. Cl. .............................. 428/32.18; 428/32.39; 428/330; 428/341; 428/403; 428/513

(58) Field of Classification Search ................ 428/323, 428/32.5, 324, 330, 331, 403, 404, 512, 513, 428/32.22, 32.63, 340, 341, 32.18, 32.39, 428/32.23

See application file for complete search history.

(56) References Cited

U.S. PATENT DOCUMENTS

| | | | | |
|---|---|---|---|---|
| 3,661,610 | A * | 5/1972 | Ferris | 106/462 |
| 4,279,661 | A * | 7/1981 | Strauch et al. | 106/464 |
| 4,729,928 | A * | 3/1988 | Schiappa et al. | 428/514 |
| 5,078,793 | A * | 1/1992 | Caton | 106/417 |
| 5,120,365 | A * | 6/1992 | Kogler | 106/415 |
| 5,312,484 | A | 5/1994 | Kaliski | |
| 5,605,568 | A * | 2/1997 | Naydowski et al. | 106/464 |
| 5,624,488 | A * | 4/1997 | Forbus et al. | 106/484 |
| 5,662,995 | A | 9/1997 | Sakurai et al. | |
| 5,731,034 | A * | 3/1998 | Husband | 427/288 |
| 5,861,209 | A * | 1/1999 | Haskins et al. | 428/330 |
| 6,020,051 | A | 2/2000 | Ebisch et al. | |
| 6,143,064 | A * | 11/2000 | Virtanen | 106/449 |
| 6,284,034 | B1 * | 9/2001 | Hiorns et al. | 106/486 |
| 6,482,581 | B1 * | 11/2002 | Govers et al. | 430/527 |
| 6,783,817 | B1 * | 8/2004 | Nemoto et al. | 428/32.24 |

FOREIGN PATENT DOCUMENTS

| | | | |
|---|---|---|---|
| EP | 0 447 094 | A | 9/1991 |
| EP | 0 878 319 | A | 11/1998 |
| EP | 952 483 | A1 | 10/1999 |
| EP | 1 065 070 | A | 1/2001 |
| WO | WO 90 01581 | A | 2/1990 |

OTHER PUBLICATIONS

European Patent Office Search Report on European Application No. 01103793.4, mailed Dec. 11, 2002.

* cited by examiner

*Primary Examiner*—Kevin R. Kruer
(74) *Attorney, Agent, or Firm*—Cook. Alex, McFarron, Manzo, Cummings & Mehler, Ltd,

(57) ABSTRACT

A support material comprises a raw paper that may be coated on at least one side with a synthetic resin, and the raw paper or the resin coating on the raw paper is provided at least on the front side with a pigment layer wherein the pigment layer contains at least about 5% by weight of a pigment with a narrow grain size distribution, whereby at least about 70% of these pigment particles feature a size of less than 1 $\mu$m and at least 40% by weight of these particles feature a grain size of 0.35 to 0.8 $\mu$m, or in that the pigment coating is a structured calcium carbonate, for example surface-modified, and both embodiments feature improved surface properties.

19 Claims, No Drawings

SUPPORT MATERIAL FOR RECORDING LAYERS

BACKGROUND OF THE INVENTION

The invention relates to a support material for recording layers which according to one embodiment of the invention may be a resin-coated support material.

Polyolefin-coated photographic support materials consist usually of a sized raw paper, which is coated on both sides with polyolefin, in most cases by extrusion.

With the extrusion coating of paper, crater-shaped faults occur on the polymer surface, as a function of the speed of the coating, referred to as pits. At high rotation speeds of the chill roll, the air bubbles which are enclosed in fine depressions on the surface of the chill roll cannot escape before coming in contact with the hot resin, with the result that the enclosed air does not escape until after the paper has been coated causing the formation of crater-shaped indentation on the polymer surface. These surface defects have a negative effect on the surface properties required of a support material, which are decisive for the image quality, such as gloss and smoothness.

An improvement in the surface can indeed be achieved by increasing the volume of the resin applied, but this measure is not sufficient at high extrusion speeds and also incurs high material costs.

EP 0 285 146 A2 proposes a gas for the suppression of the occurrence of pits, which is lighter than air and can escape through the extruded film, to be applied to the surface of the chill roll in order to expel the air bubbles. The disadvantage to this, however, is the high technical investment.

U.S. Pat. No. 4,994,357 proposes that the pressure with which the polyethylene-coated paper is pressed onto the chill roll be increased, to suppress the occurrence of pits. Because of the high contact pressure, however, only a low production speed is possible, since at higher speeds the polyethylene may come loose from the paper.

EP 0 952 483 A1 describes a photographic support material (base paper), of which the polyethylene surface is of high quality, and which is not impaired even by manufacture at high extrusion speed. To this purpose, EP 0 952 483 A1 proposes that the raw paper be provided with a layer containing clay, whereby the quantity of clay must not exceed 3.3 g/m$^2$. The disadvantage with this support material is the inadequate adherence between the layer containing the pigment and the polyethylene layer extruded onto it.

A uniform surface of the support material is of significance not only for the photographic recording materials. To obtain an appearance similar to a photograph, polyolefin-coated papers are used in the manufacture of non-photographic recording materials, such as ink-jet papers. A non-uniform or blemished surface of the support material is made noticeable by glossy flecks on the recorded image, and is therefore also undesirable with these recording materials.

SUMMARY OF THE INVENTION

It is therefore an object of the invention to create a resin-coated support material for recording materials, obtainable at high extrusion speeds, with a uniform smooth surface and with a low level of pits.

It is a further object of the invention to eliminate problems with the adherence of the resin coating on the raw paper, and to provide a support material with a high whiteness and rigidity.

It is still a further object of the invention to provide an ink-jet-recording material with an excellent behaviour in view of cockle.

These problems are solved by a support material (base paper) coated at least on the front side with a synthetic resin, which features a raw paper provided at least on the front side with a pigment layer, whereby the pigment layer contains a pigment of at least about 5% by weight of pigment with a narrow grain size distribution, and at least 70% of these pigment particles feature a size of less than about 1 $\mu$m, and at least 40% by weight of these particles feature a grain size of 0.35 to 0.8 $\mu$m.

As far as the ink-jet-applications are concerned the problem to have a low cockle may already be solved with an ink-jet-recording material comprising a raw paper as a support having at least on the front side a pigment layer, whereby the pigment layer contains at least about 5% by weight of pigment with a narrow grain size distribution, and at least 70% of these pigment particles feature a size of less than about 1 $\mu$m, and at least 40% by weight of these particles feature a grain size of 0.35 to 0.8 $\mu$m. Thus, this ink-jet recording material does not have a resin coated raw paper as support.

DETAILED DESCRIPTION OF THE PREFERRED EMBODIMENT

Preferably, 50 to 80% by weight of the particles with a smaller diameter than 1 $\mu$m feature have a grain size of 0.35 to 0.8 $\mu$m. The proportion of the pigment with the narrow distribution can amount to 10 to 90% by weight, and particular preferred 30 to 80% by weight of the total pigment of the pigment layer.

The term pigment with a narrow grain size distribution is to be understood according to the invention as also including pigments with a grain size distribution in which at least 70% by weight of the pigment particles feature have a size of less than about 1 $\mu$m and with 40 to 80% by weight of these pigment particles the difference between the pigment with the largest grain size (diameter) and the pigment of the smallest grain size is less than about 0.4 $\mu$m.

The support materials according to the invention differ from the support materials of EP 0 952 483 A1 by the use of a pigment with a specific grain size distribution or by the use of a selected surface-modifying calcium carbonate. The support material according to the invention is not subject to the restriction with regard to an upper limit of 3.3 g/m$^2$ for the clay contained in the pigment layer. By means of the pigment selection according to the invention, a series of surprising advantages are achieved.

It was surprising that a substantially better adherence of the polyolefin layer to the pigment layer of the raw paper was achieved than in EP 0 952 483 A1. The roughness values, and therefore the gloss of the support material were improved. In comparison with EP 0 952 483 A1, according to which the roughness depth should probably not fall short of the value of 0.5 $\mu$m, due to adherence problems, according to the invention a good adherence is still achieved even with a roughness of less than 0.5 $\mu$m.

The extrusion coating could be produced without any increase in adherence problems or any increase in the levels of pits, even at high speeds of up to 600 m/min, with usual speeds at present being 200 to 250 m/min. At the same time, savings of the polyolefin of 15 to 30% were achieved.

The pigment can be selected from the groups of the metal oxides, silicates, carbonates, sulphides, and sulphates. Especially suitable are kaolins, talcum, calcium carbonate and/or barium sulphate. A calcium carbonate with a $d_{50}$ value of about 0.7 μm has proved to be particularly advantageous, for example. According to a further preferred embodiment, a pigment mixture of calcium carbonate and clay is used. The mass ratio of calcium carbonate to kaolin (clay) amounts preferably to 30:70 to 70:30. It was found, surprisingly, that despite the high proportion of the clay which inclined to turn yellow, only an insubstantial effect was to be observed on the whiteness of the support material.

As a bonding agent in the pigment layer, use may be made in the paper industry of conventional natural and synthetic polymers. Particularly well-suited are such as starches, gelatines, styrene/butadiene latex, styrene/acrylate latex, polyvinyl alcohol, or mixtures thereof. A mixture of starch and styrene latex in a ratio of 2:1 to 1:2 proved to be particularly well-suited.

The mass ratio of pigment to binding agent in the pigment layer amounts to 30:70 to 90:10, and in particular 85:15.

The layer containing pigment, between the raw paper and resin, can be applied as an individual layer or multilayer on the raw paper. The coating mass can be applied by all conventional application devices, whereby the amount is selected in such a way that, after drying, the application weight per layer amounts to max. 20 $g/m^2$, in particular 8 to 17 $g/m^2$.

In a special embodiment of the invention, the raw paper, before being coated with the pigment layer according to the invention, is provided with an additional preliminary coating containing pigment. Suitable as the pigment are all conventional white pigments, such as precipitated calcium carbonate, titanium dioxide, clay (kaolin), talcum, or barium sulphate, with a particle size from 0.1 to 10 μm, in particular 0.1 to 2 μm. The application weight of the preliminary layer must not exceed about 20 $g/m^2$. The application of the pigment layer according to the invention for preference does not take place until after the preliminary layer has dried.

For the manufacture of the raw paper, all types of cellulose fibres and synthetic fibres are suitable. For the sizing, all the sizing and wet bonding agents known in the paper industry are suitable. The raw paper may contain pigments and filling agents such as clay, calcium carbonate, or titanium dioxide, as well as additional auxiliary substances such as defoaming agents, optical brighteners, and colouring agents.

The raw paper may be manufactured on a Fourdrinier or cylinder paper machine. The basis weight of the raw paper can be 50 to 250 $g/m^2$, in particular 80 to 170 $g/m^2$.

To manufacture the support material according to the invention, a paper of less high quality can also be used, for the manufacture of which, for example, recycled pulp fibres may be used. The raw paper can be used in non-compressed or compressed (smoothed) form. Particularly well-suited are non-compressed raw papers with a density of less than 0.9 $g/cm^3$, with the intention of saving on material costs.

The surface of the pigment layer according to the invention is coated with a synthetic resin, for example a polyolefin such as polyethylene, polypropylene, or polybutene, as well as with copolymers of two or more olefins, by extrusion. Particularly well-suited are polyethylene types of lower densities (LDPE), high density polyethylene types (HDPE), ethylene/α-olefin-copolymers (LLDPE), and mixtures thereof. The polymer layer may contain white pigments such as titanium oxide, as well as additional ancillary substances such as optical brighteners, coloring agents, or dispersion auxiliary agents. The application weight of the polymer layer is 5 to 30 $g/m^2$, in particular 10 to 25 $g/m^2$. It was found that even with a reduction of the application weight of 15 to 30%, a comparable level of pits is achieved. The polymer layer can be extruded as a single layer or co-extruded as multi-layer.

In a preferred embodiment of the invention, the reverse side of the raw paper is coated with a clear, i.e. pigment-free polyolefin, in particular polyethylene. The reverse side of the support material can also feature additional function layers such as anti-static or anti-curling layers.

The support material according to the invention can be used as a support for photographic emulsions, ink-jet recording layers, and for recording layers for what are referred to as thermal colour transfer processes (D2T2).

The following examples serve to provide further explanation of the invention.

EXAMPLES

Examples 1 to 10

A standard photographic raw paper was used with a basis weight of 162 $g/m^2$, which was manufactured from a pulp suspension containing 100% by weight hardwood sulphate pulp and 0.5% by weight of alkyl ketendimer and 0.7% by weight polyamide-polyamine epichlorohydrin resin each based on the pulp and was surface-sized with an oxidated starch.

The raw paper was used in the non-compressed form, i.e. not smoothed, and featured a density of 0.84 $g/cm^3$.

A variety of coatings according to the invention were applied to this raw paper with the aid of a "bent blade" application device and dried. The composition of the pigment layers created are reproduced in Table 1.

TABLE 1

| Component | 1 | 2 | 3 | 4 | 5 | 6 | 7 | 8 | 9 | 10 |
|---|---|---|---|---|---|---|---|---|---|---|
| $CaCO_3$($d_{50\%}$ = 0.7 μm) | 30 | 30 | 30 | 100 | — | — | 30 | 50 | — | 70 |
| Modified $CaCO_3$* | — | — | — | — | — | — | — | — | 30 | — |
| Clay 1 **) | 70 | 70 | 70 | — | 100 | — | — | — | 70 | 30 |
| Clay 2 ***) | — | — | — | — | — | — | 70 | — | — | — |
| Talcum | — | — | — | — | — | 100 | — | 50 | — | — |
| Styrene/butadiene latex | 8 | 8 | 8 | 8 | 8 | 8 | 8 | 8 | 8 | 8 |
| Starch | 6 | 6 | 6 | 6 | 6 | 6 | 6 | 6 | 6 | 6 |
| Calcium stearate | 0.8 | 0.8 | 0.8 | 0.8 | 0.8 | 0.8 | 0.8 | 0.8 | 0.8 | 0.8 |
| Application weight [$g/m^2$] | 5 | 11 | 17 | 10 | 10 | 10 | 10 | 10 | 10 | 10 |

*) Calcium carbonate modified with clay

**) 96–100% pigment particles <2 μm Hydragloss ® 90)

***) 94–98% pigment particles <2 μm (Hydragloss ® E)

Examples 11 to 18

The raw paper used in Example 1 was coated and dried in-line with the aid of a film press with the coating according to Example 1 and dried. The application weight was 10 $g/m^2$. The compositions are reproduced in Table 2.

TABLE 2

| Component | 11 | 12 | 13 | 14 | 15 | 16 | 17 | 18 |
|---|---|---|---|---|---|---|---|---|
| $CaCO_3$ ($d_{50\%}$ = 0.7 μm) | 30 | 70 | 100 | — | — | 30 | 50 | — |
| Modified $CaCO_3$ *) | | | | | | | | 30 |
| Clay 1 **) | 70 | 30 | | 100 | | | | 70 |
| Clay 2 ***) | | | | | | 70 | | |
| Talcum | | | | | 100 | | 50 | |
| Styrene/butadiene latex | 8 | 8 | 8 | 8 | 8 | 8 | 8 | 8 |
| Starch | 6 | 6 | 6 | 6 | 6 | 6 | 6 | 6 |
| Calcium scearate | 0.8 | 0.8 | 0.8 | 0.8 | 0.8 | 0.8 | 0.8 | 0.8 |
| Application weight [$g/m^2$] | 10 | 10 | 10 | 10 | 10 | 10 | 10 | 10 |

*) Calcium carbonate modified with clay
**) 96–100% pigment particles <2 μm Hydragloss ® 90)
***) 94–98% pigment particles <2 μm (Hydragloss ® E)

Example 19

The raw paper used in Example 1 was first coated "in-line" with the aid of a film press with a coating solution containing 30% by weight of a conventional calcium carbonate. The application weight was 12 $g/m^2$. After drying, in the next step a pigment layer according to Example 1 (Table 1) was applied, with an application weight of 10 $g/m^2$.

The raw papers coated according to the Examples 1 to 19 were coated with a mixture of 72% by weight of a low-density polyethylene (LDPE, 0.923 $g/cm^3$), 15% by weight of a titanium dioxide master batch (50% by weight LDPE and 50% by weight $TiO_2$), and 13% by weight of other additives such as optical brighteners, calcium stearate, and blue pigment with different application weights (28 $g/m^2$, 23 $g/m^2$, 18 $g/m^2$, and 13 $g/m^2$). The coating was carried out at extrusion speeds of 250 m/min and 350 m/min.

Example 20

The $CaCO_3$ coated paper of example 4 was coated with an ink recording layer of the composition:

| | |
|---|---|
| $Al_2O_3$ (average particle size 1.2 μm) | 25% wt. |
| Silica (average particle size 6.5 μm) | 40% wt. |
| Polyvinyl alcohol (completely saponified) | 21% wt. |
| Quaternary polyammonium salt | 14% wt. |

The coating weight of the recording layer was 20 $g/m^2$. This recording material was tested in view of its cockle index. The results are shown below.

Comparison Example V1

The surface-sized raw paper from Examples 1 to 10 was coated on the front side with a polyethylene mixture according to Examples 1 to 19, at an extrusion speed of 200 m/min and 250 m/min.

Comparison Example V2

A base paper according to Example 1 of EP 0 952 483 A1 with a compound sizing with starch was coated with a solution of clay and polyacrylic acid. The amount of clay in the layer was 1.9 $g/m^2$. The layer containing the pigment was then coated with a mixture of $TiO_2$ and LDPE at an application weight of 29 $g/m^2$ and an extrusion speed of 300 m/min. The reverse side of the base paper was coated with a clear polyethylene.

Comparison Example V3

As a comparison for the ink-jet recording material of example 20 a raw paper without the pigment coating of example 4 was used. Onto the raw paper the ink-recording layer with the composition of example 20 was coated with a coating weight of 20 $g/m^2$.

Comparison Example V4

As a comparison for the ink-jet recording material of example 20 a usual copying paper was tested. Such usual copying papers feature a pigment coating.

Testing of the support material manufactured in accordance with the examples and the comparison examples Determination of the Number of Pits The surface of the paper coated with the polyolefin is magnified with a microscope and scanned with a CCD camera. By means of an image processing program a profile of the pits level is produced from 30 measuring points. The results are shown in Table 3.

It can be seen from Table 3 that the samples according to the invention feature a lower number of pits than the sample from comparison example V1. The pits level of Examples 1 to 10 is comparable to that of V2. The pits level of Examples 11 to 19 falls only slightly in relation to that of Examples 1 to 10.

Gloss Measurement

The measurement was effected with a three-angle gloss measuring device according to DIN 67 530 at an angle of 60°. The results are compiled in Table 3.

The smoothness of the samples from Examples 1 to 19 has improved, with the exception of those of Examples 4, 10, and 11, in relation to V1 and V2.

Determination of Roughness

The roughness was determined on papers before the extrusion coating with a UBM measuring device according to DIN 4768 with a cut-off setting of 0.8 mm.

In this case too, the samples according to the invention featured clearly better roughness values than the samples from V1 and V2, whereby the sample from V1 clearly fell in relation to the sample from V1.

Colour Value Determination

The L, a, b values were determined with the aid of the Elrepho 2000 colour measuring device in individual sheet measurements (D65, 10°, UVI).

Adherence of Polyethylene

The measurements were conducted immediately after the extrusion coating, with a tensile strength testing device from Lorentzen & Wettre, on paper samples with a width of 10 mm at a draw-off angle of 180° and a draw-off speed of 50 mm/min. The measured values are given in N/15 mm and summarised in Table 3.

The samples according to the invention show a clearly improved adherence of the resin to the pigment layer both in relation to the sample from V1 as well as from V2.

Stiffness

The stiffness values were determined with the bending stiffness testing device from Lorentzen & Wettre in accordance with Standard SCAN-P 29.69. The values are given in mN and reproduce the stiffness in the longitudinal direction.

In comparison with the comparison example V1, all the samples show perceptibly improved stiffness. The samples according to the invention from Examples 1 and 2 show a slight improvement against the sample from V2.

Cockle Index

The cockle behaviour of the samples was determined visually according to a procedure developed by the Technical University of Darmstadt. For examination, the paper to be tested was placed onto a plane surface and was exposed to light by means of an angularly arranged light source. A cockle index of lower than 10 means no cockle, 10 to 16 means low to moderate cockle, 16 to 20 means strong cockle, more than 20 means very strong cockle. The sample according to the invention shows an excellent cockle index (10.7) as compared to comparative examples V3 (24.3) and 4 (29.7).

TABLE 3

| | Examples | | | | | | | | | |
|---|---|---|---|---|---|---|---|---|---|---|
| Properties | 1 | 2 | 3 | 4 | 5 | 6 | 7 | 8 | 9 | 10 |
| Pits | 1.5 | 1.5 | 1.6 | 1.5 | 1.4 | 1.4 | 1.5 | 1.6 | 1.5 | 1.5 |
| Roughness Ra μm | 0.49 | 0.45 | 0.47 | 0.50 | 0.49 | 0.48 | 0.46 | 0.49 | 0.48 | 0.50 |
| Gloss (s) | 78 | 77.6 | 78.8 | 75.3 | 78.8 | 78.8 | 77.1 | 78.8 | 78.0 | 75.1 |
| Stiffness mN/15 mm | 557 | 557 | 622 | 606 | 577 | 609 | 598 | 602 | 655 | 641 |
| L | 97.5 | 97.6 | 97.4 | 98.2 | 97.5 | 96.6 | 97.1 | 97.4 | 97.4 | 97.9 |
| Colour values | | | | | | | | | | |
| b | −3.79 | −1.55 | 0.45 | −4.49 | −0.86 | −6.48 | −0.95 | −3.59 | −3.94 | −2.92 |
| Adherence N/15 mm | 2.5 | 2.3 | 2.2 | 3.0 | 2.9 | 2.8 | 2.9 | 2.7 | 2.8 | 2.8 |

| | Examples | | | | | | | | | | |
|---|---|---|---|---|---|---|---|---|---|---|---|
| Properties | 11 | 12 | 13 | 14 | 15 | 16 | 17 | 18 | 19 | V1 | V2 |
| Pits | 1.8 | 1.9 | 2.0 | 1.8 | 1.8 | 1.8 | 1.9 | 1.8 | 1.6 | 4.8 | 1.5 |
| Roughness Ra μm | 0.50 | 0.49 | 0.50 | 0.48 | 0.46 | 0.48 | 0.49 | 0.49 | 0.48 | 1.46 | 0.95 |
| Gloss (s) | 75.1 | 78.7 | 77.7 | 76.4 | 76.8 | 76.0 | 78.4 | 75.1 | 78.8 | 75.2 | 74.8 |
| Stiffness mN/15 mm | 655 | 666 | 651 | 628 | 598 | 602 | 576 | 655 | 665 | 519 | 540 |
| L | 97.4 | 97.9 | 97.9 | 97.4 | 97.4 | 96.9 | 97.4 | 97.4 | 97.9 | 93.0 | 93.8 |
| Colour values | | | | | | | | | | | |
| b | −3.94 | −5.44 | −5.96 | −4.07 | −6.48 | −2.34 | −5.89 | −3.94 | −4.48 | −8.00 | −2.50 |
| Adherence N/15 mm | 2.8 | 2.7 | 2.7 | 1.5 | 2.6 | 2.8 | 2.7 | 2.9 | 2.8 | 1.5 | 1.2 |

What is claimed is:

1. Support material for receiving a photographic, an ink jet or a thermal transfer image receptive layer thereon and coated on at least one side with a synthetic resin, said support material containing a raw paper provided at least on the front side with an image free pigment coating, wherein the synthetic resin which receives the image receptive layer thereon is a polyolefin resin on the image free pigment coating, and wherein the pigment coating contains at least about 5% by weight of a pigment having particles with a narrow grain distribution with respect to the weight of the total pigment in the pigment layer, whereby at least about 70% by weight of the pigment particles have a size of less than about 1 $\mu$m and at least 40% by weight of the particles have a grain size of 0.35 to 0.8 $\mu$m.

2. Support material according to claim 1, wherein the pigment is a calcium carbonate.

3. Support material according to claim 1, wherein the coating contains a pigment mixture which contains at least about 30% by weight kaolin.

4. Support material according to claim 1, wherein the application weight of the coating amounts to a maximum of about 20 g/m$^2$.

5. Support material according to claim 1, wherein the raw paper is a slightly compressed paper with a density of less than about 1 g/cm$^3$.

6. Support material according to claim 1, wherein the synthetic resin is present in the amount of 5 to 30 g/m$^2$.

7. Support material according to claim 1, wherein the roughness of the paper with the pigment coating is 0.5 $\mu$m or less.

8. Support material according to claim 1, wherein the pigment coating contains calcium carbonate which has a surface modified by an inorganic substance in platelet shape.

9. Support material according to claim 8, wherein the pigment coating contains a pigment mixture which contains at least about 30% by weight of clay.

10. The support material according to claim 8, wherein the synthetic resin is present in the amount of 5 to 30 g/m$^2$.

11. Support material according to claim 8, wherein the proportion of the surface modified calcium carbonate pigment in the total amount of pigment amounts to at least about 5% by weight.

12. Support material according to claim 11, wherein the application weight of the coating amounts to a maximum of about 20 g/m$^2$.

13. Support material for an ink-jet image receptive layer comprising a raw paper provided at least on the front side with an image free pigment coating, a polyolefin resin for receiving the image receptive layer on the image free pigment coating, and wherein the pigment coating contains at least about 5% by weight of a pigment having particles with a narrow grain distribution with respect to the weight of the total pigment in the pigment layer, whereby at least about 70% by weight of the pigment particles have a size of less than about 1 $\mu$m and at least 40% by weight of the particles have a grain size of 0.35 to 0.8 $\mu$m.

14. Support material according to claim 13, wherein the pigment is a calcium carbonate.

15. Support material according to claim 13, wherein the coating contains a pigment mixture which contains at least about 30% by weight kaolin.

16. Support material according to claim 13, wherein the application weight of the coating amounts to a maximum of about 20 g/m$^2$.

17. Support material according to claim 13, wherein the calcium carbonate has a surface modified by an inorganic substance in platelet shape.

18. The support material according to claim 13, wherein the synthetic resin is present in the amount of 5 to 30 g/m$^2$.

19. Support material according to claim 13, wherein the roughness of the paper with the pigment coating is 0.5 $\mu$m or less.

* * * * *